UNITED STATES PATENT OFFICE.

JOHN R. NOLAN, OF YONKERS, NEW YORK, ASSIGNOR TO THE DIAMOND MATCH COMPANY, OF CHICAGO, ILLINOIS, A CORPORATION OF ILLINOIS.

PROCESS OF TREATING MATCH-SPLINTS.

1,168,901.  Specification of Letters Patent.  Patented Jan. 18, 1916.

No Drawing.  Application filed March 9, 1915.  Serial No. 13,141.

*To all whom it may concern:*

Be it known that I, JOHN R. NOLAN, a citizen of the United States, and resident of Yonkers, in the county of Westchester and State of New York, have invented certain new and useful Improvements in Processes of Treating Match-Splints, of which the following is a specification.

This invention concerns a process of impregnating match splints with a dry anti-glowing substance through the agency of a comminuted or finely-divided vehicle which is incorporated with such substance; which vehicle in the preferred form of the invention comprises a fusible substance adapted to impart a flaming property to the splints.

In practising the invention in a simple and efficient manner a hard wax, such as paraffin, is comminuted or finely-divided, and is then intimately mixed with a pulverized anti-glowing material, such, for example, as boric acid or alum. This mixture is applied to the splints in any suitable manner, as, for example, by dipping the splints for a part or the whole of their length into and then removing them from the mixture; or by agitating or otherwise distributing the mixture among the splints. A coat of the material thus adheres to the exposed surface of the splints. The coated splints are then subjected to the influence of a temperature sufficient to melt the wax, and the latter, being absorbed by the permeable splint material, effectually carries or drives the powdered anti-glowing material into the pores of the material.

Preferably the splints are heated preparatory to the application of the mixture thereto, as thereby the mixture is caused more uniformly to adhere to the surface of the splints. Good results are obtained by the use of a mixture comprising, for example, wax 90% and impregnating powder 10%. This proportion may, of course, be varied to meet particular requirements.

It is to be noted that instead of solid paraffin, hard resins, such as carnauba, dammar, &c., may be finely divided and incorporated with the impregnating material.

The present process has been more especially designed for treatment of the splints during the production of matches on a match making machine of the so-called continuous type wherein the splints are inserted row by row into an endless chain and thereby transported through the match making path. In that case a chamber containing the mixture is arranged at a suitable point beneath the route of the splint chain, so that the chain with its load of depending separated rows of splints progresses through the chamber and the splints are given a coat of the contained mixture, as above described. At each end of this chamber are heaters, such as steam heated chests, through which the chain with its splints progresses before and after its passage through the impregnation chamber.

By the process above described wherein an inflammable material is used as one of the ingredients of the mixture, flaming and non-glowing properties are economically and efficiently imparted to the match splints.

I claim—

1. A process of treating match splints to impart a non-glowing property thereto, which consists in coating the splints with a finely-divided anti-glowing material with which is incorporated a finely-divided material which serves as a vehicle to carry the anti-glowing material into the splints.

2. A process of treating match splints to impart a non-glowing property thereto, which consists in coating the splints with a finely divided anti-glowing material with which is incorporated a finely divided material which is fusible by heat, and then in heating the coated splints.

3. A process of treating match splints which consists in coating the splints with finely-divided anti-glowing material with which is incorporated a finely-divided inflammable material which is fusible by heat, and then in heating the coated splints.

4. A process of treating match splints which consists in heating the splints; coating them with a finely-divided anti-glowing material with which is incorporated a finely-divided wax, and then heating the coated splints.

Signed at New York in the county and State of New York this 8th day of March A. D. 1915.

JOHN R. NOLAN.

Witnesses:
 B. CHANDLER SNEAD,
 M. B. GOERNEY.

Copies of this patent may be obtained for five cents each, by addressing the "Commissioner of Patents, Washington, D. C."